United States Patent
Morino

(10) Patent No.: US 10,118,294 B2
(45) Date of Patent: Nov. 6, 2018

(54) CONTROL DEVICE, CONTROL METHOD AND NON-TRANSITORY RECORDING MEDIUM

(71) Applicant: OMRON Corporation, Kyoto (JP)

(72) Inventor: Koji Morino, Tokyo (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/750,832

(22) PCT Filed: Oct. 31, 2016

(86) PCT No.: PCT/JP2016/082293
§ 371 (c)(1),
(2) Date: Feb. 6, 2018

(87) PCT Pub. No.: WO2017/094423
PCT Pub. Date: Jun. 8, 2017

(65) Prior Publication Data
US 2018/0229365 A1 Aug. 16, 2018

(30) Foreign Application Priority Data
Nov. 30, 2015 (JP) .................. 2015-234142

(51) Int. Cl.
*G05B 11/01* (2006.01)
*B25J 9/16* (2006.01)
(Continued)

(52) U.S. Cl.
CPC ............ *B25J 9/1628* (2013.01); *B25J 9/126* (2013.01); *G05D 3/12* (2013.01); *H02P 5/50* (2013.01)

(58) Field of Classification Search
CPC .... H02P 1/00; H02P 1/026; H02P 1/04; H02P 1/26; H02P 1/42; H02P 1/46; H02P 1/50;
(Continued)

(56) References Cited

U.S. PATENT DOCUMENTS 4,409,650 A * 10/1983 Noguchi .............. B23K 9/1272
219/124.34

FOREIGN PATENT DOCUMENTS

JP   S56-52408   5/1981
JP   S6123213    1/1986
(Continued)

OTHER PUBLICATIONS

"International Search Report (Form PCT/ISA/210) of PCT/JP2016/082293", dated Dec. 27, 2016, with English translation thereof, pp. 1-4.

(Continued)

*Primary Examiner* — Antony M Paul
(74) *Attorney, Agent, or Firm* — JCIPRNET

(57) ABSTRACT

The objective of the present invention is to provide a control device capable of suppressing trajectory misalignment due to deviation between the response delay times of a plurality of axes (a plurality of servomotors). In this control device, which issues commands to a plurality of servo drivers corresponding to a plurality of servomotors, the servo driver corresponding to a standard servomotor for which the response delay time is the greatest among the plurality of servomotors is set as a standard servo driver, and the command timing for the other servo drivers is delayed more than the command timing for the standard servo driver, by an amount equal to the difference between the response delay time of the standard servomotor and the response delay time of the servomotors corresponding to the other servo drivers.

8 Claims, 11 Drawing Sheets

(51) Int. Cl.
*G05D 3/12* (2006.01)
*H02P 5/50* (2016.01)
*B25J 9/12* (2006.01)

(58) Field of Classification Search
CPC .... H02P 6/00; H02P 6/04; H02P 6/142; H02P 6/14; H02P 23/00; H02P 23/004; H02P 23/0063; H02P 5/00; H02P 25/08; H02P 25/10; H02P 27/00; H02P 2005/4007; H02P 2006/04; H02P 2203/11; H02P 3/18; H02P 1/24; H02P 27/04; H02P 29/04; G05B 11/01; G05B 13/00; G05B 11/32; G05B 2219/34027; H03K 5/00
USPC ............ 318/7, 51, 560, 625, 400.01, 400.1, 318/400.13, 700, 799, 400.14, 400.15
See application file for complete search history.

(56) References Cited

FOREIGN PATENT DOCUMENTS

| | | |
|---|---|---|
| JP | H4-20103 | 2/1992 |
| JP | H9-16229 | 1/1997 |
| JP | 2009-151527 | 7/2009 |

OTHER PUBLICATIONS

"Written Opinion of the International Searching Authority (Form PCT/ISA/237)" of PCT/JP2016/082293, dated Dec. 27, 2016, with English translation thereof, pp. 1-8.

* cited by examiner

CONTROL DEVICE, CONTROL METHOD AND NON-TRANSITORY RECORDING MEDIUM

CROSS-REFERENCE TO RELATED APPLICATION

This application is a 371 of international application of PCT application serial no. PCT/JP2016/082293, filed on Oct. 31, 2016, which claims the priority benefit of Japan application no. 2015-234142, filed on Nov. 30, 2015. The entirety of each of the abovementioned patent applications is hereby incorporated by reference herein and made a part of this specification.

TECHNICAL FIELD

The present invention relates to a control device, a control method, and a non-transitory recording medium.

BACKGROUND ART

Patent Literature 1 discloses a method of controlling an operation of a robot, in which a control device for controlling a motion of the robot calculates a difference between a target trajectory and an actual motion trajectory with respect to a command value for each axis as a servo delay time, sets the shortest servo delay time as a reference time, calculates a compensation torque for each axis on the basis of the servo delay time for each axis and the reference time, and controls the operation of the robot by outputting a command value reflecting the compensation torque for each axis to each servo.

CITATION LIST

Patent Literature

[Patent Literature 1]
Japanese Unexamined Patent Application Publication No. 2009-151527 (published on Jul. 9, 2009)

SUMMARY OF INVENTION

Technical Problem

In the above-described method, there is a problem that calculation of the compensation torque based on the servo delay time for each axis and the reference time and calculation of the command value reflecting the compensation torque are complicated.

The present invention has been made in view of the above problem, and it is an object of the present invention to realize a control device capable of suppressing trajectory misalignment due to a deviation between response delay times of a plurality of axes (a plurality of servomotors).

Solution to Problem

This control device is a control device which issues commands to a plurality of servo drivers corresponding to a plurality of servomotors, wherein a servo driver corresponding to a standard servomotor having a maximum response delay time among the plurality of servomotors is set as a standard servo driver, and a command timing to another servo driver is delayed from a command timing to the standard servo driver by a difference between a response delay time of the standard servomotor and a response delay time of a servomotor corresponding to the another servo driver.

Advantageous Effects of Invention

According to the control device, it is possible to suppress trajectory misalignment due to a deviation between response delay times of a plurality of servomotors.

DESCRIPTION OF EMBODIMENTS

An embodiment of the present invention will be described with reference to FIGS. 1 to 11. Hereinafter, description will be made on the assumption of a synchronous group having three axes (X axis, Y axis and Z axis) as illustrated in FIG. 1, but the synchronous group of the embodiment may have a configuration having two or more axes.

Figure 1:
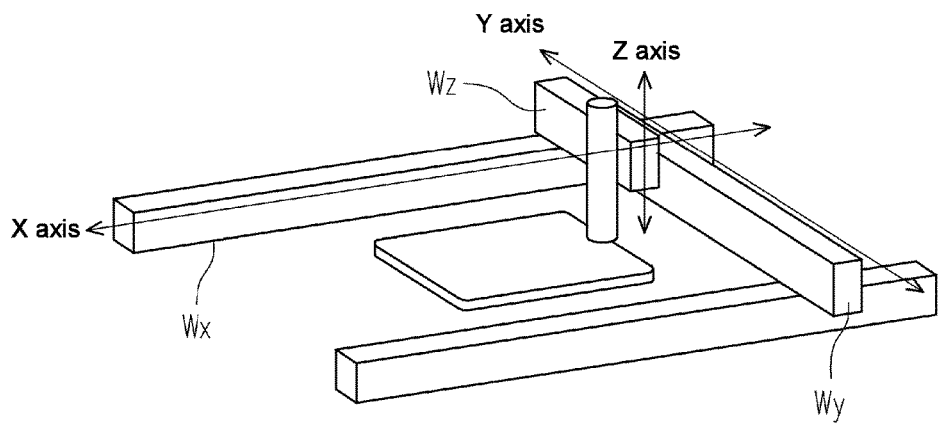
FIG. 1 is a schematic view illustrating a configuration having a plurality of axes.

In the three-axis configuration as illustrated in FIG. 1, for example, an X axis servo driver which receives a command from a control device controls an X axis servomotor, and a workpiece Wx moves in an X-axial direction due to the X axis servomotor (operation information of the X axis servomotor is fed back to the X axis servo driver). Also, a Y axis servo driver which receives a command from the control device controls a Y axis servomotor, and a workpiece Wy moves in a Y-axial direction due to the Y axis servomotor (operation information of the Y axis servomotor is fed back to the Y axis servo driver). Also, a Z axis servo driver which receives a command from the control device controls a Z axis servomotor, and a workpiece Wz moves in a Z-axial direction due to the Z axis servomotor (operation information of the Z axis servomotor is fed back to the Z axis servo driver).

(Suppression of Trajectory Misalignment Due to a Difference Between Response Delay Times of Axes)

Generally, the commands to the X axis servo driver, the Y axis servo driver and the Z axis servo driver are synchronized, but a time (response delay time) until the corresponding servomotor responds after receipt of the command varies according to the axes.

Figure 2:
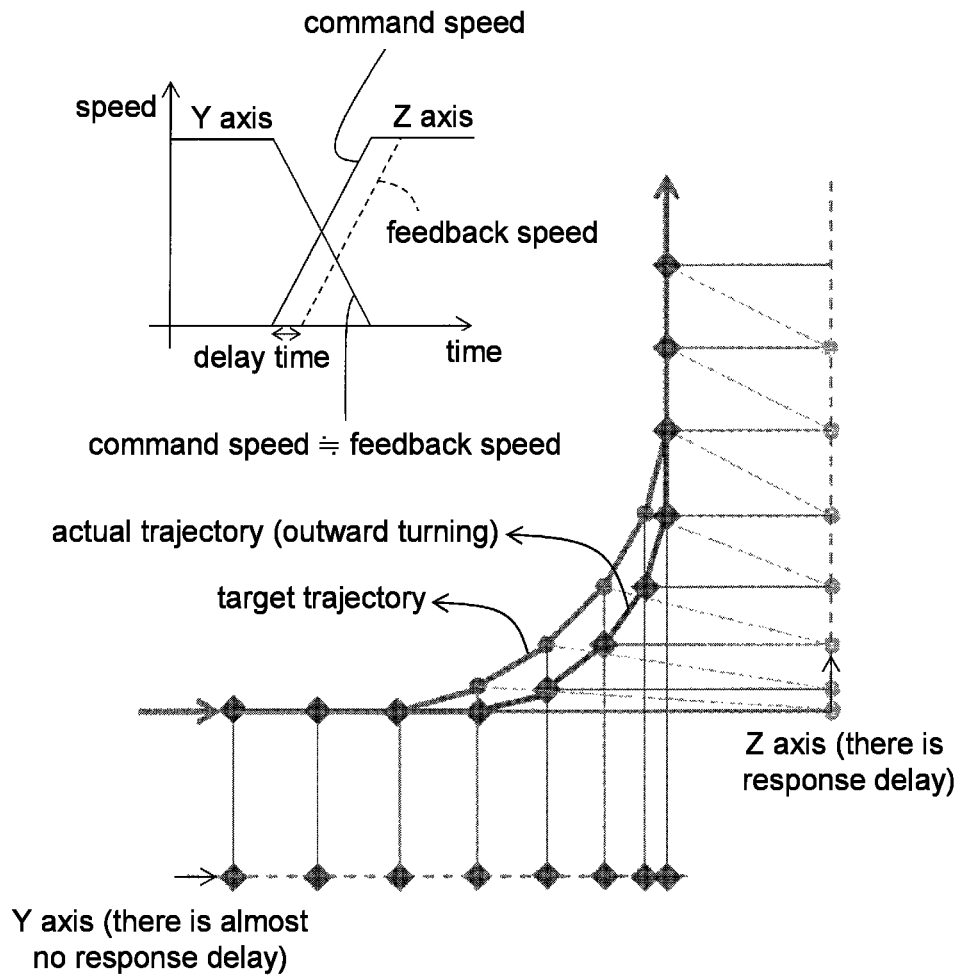
FIG. 2 is a reference diagram illustrating an example of trajectory misalignment due to a difference between response delay times of the axes.

For example, when there is almost no (small) response delay in a Y axis system and the response delay in a Z axis system is large, as illustrated in FIG. 2, a command speed and a feedback speed almost coincide with each other in the Y axis system, whereas the command speed and the feedback speed are temporally misaligned in the Z axis system, and thus a rise in the Z-axial direction on a corner trajectory is delayed, resulting in a trajectory located outward from a target trajectory.

Figure 3A:
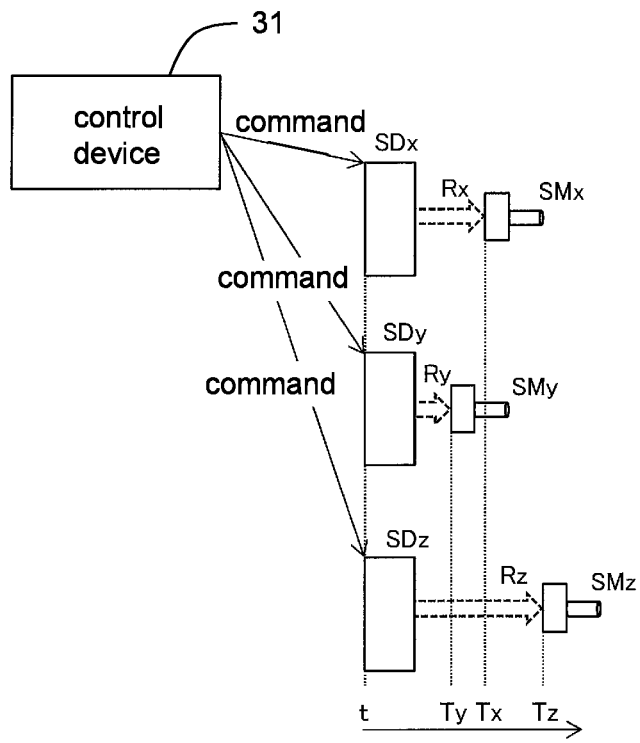
FIG. 3(a) and FIG. 3(b) are reference diagrams illustrating a principle of the trajectory misalignment due to the difference between response delay times of the axes.
Figure 3B:
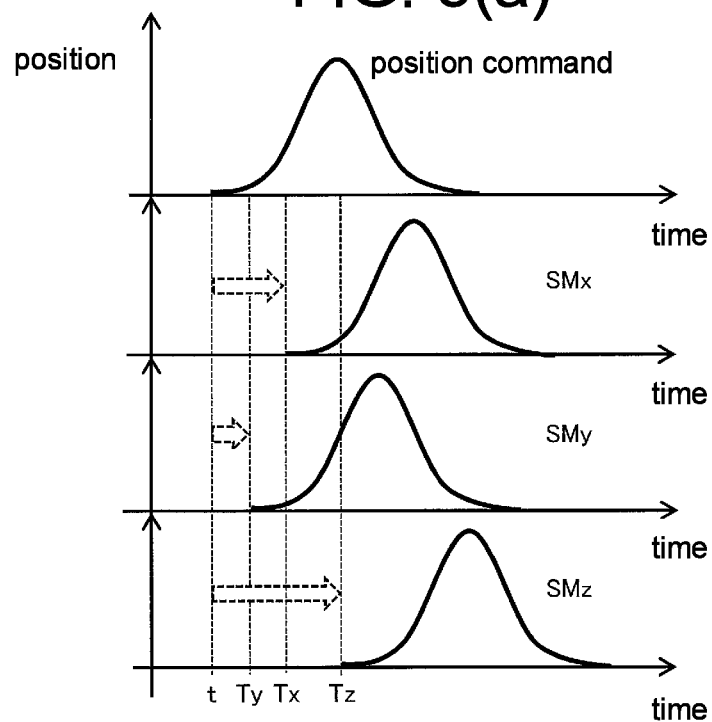

That is, as illustrated in FIG. 3(a), when it is assumed that the response delay time of the X axis servo driver (hereinafter, servo driver SDx) is Rx, the response delay time of the Y axis servo driver (hereinafter, servo driver SDy) is Ry, the response delay time of the Z axis servo driver (hereinafter, servo driver SDz) is Rz, and position commands from the control device 31 reach the servo driver SDx, the servo driver SDy and the servo driver SDz in synchronization with a time t, a response time of the servomotor SMx is Tx (=t+Rx), a response time of the servomotor SMy with the minimum response delay time is Ty (=t+Ry), the response time of the servomotor SMz with the maximum response delay time is Tz (=t+Rz), and the three servomotors respond at scattered times and pass through a trajectory misaligned from the target trajectory as illustrated in FIG. 3(b).

Figure 4A:
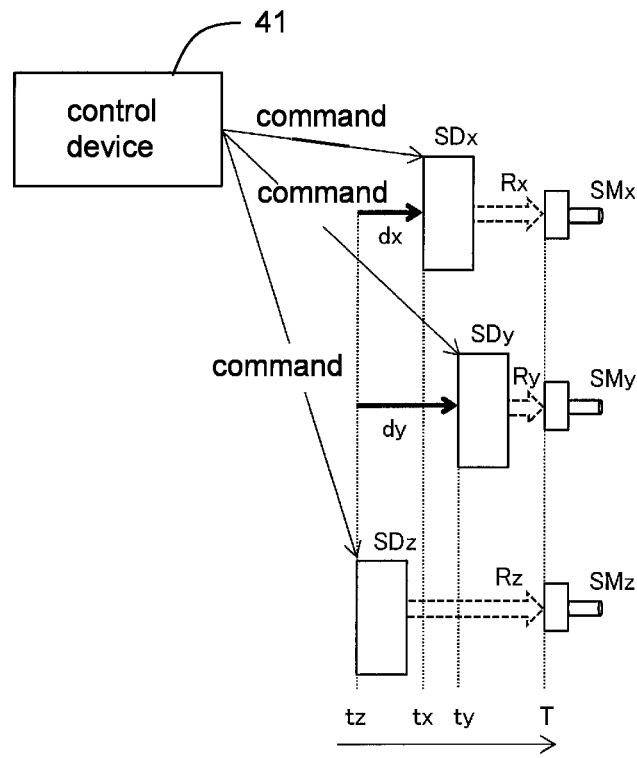
FIG. 4(a) and FIG. 4(b) are reference diagrams illustrating a position command of a control device according to the present invention.

Therefore, in the embodiment, in order to suppress the trajectory misalignment due to the difference between the response delay times of the axes, as illustrated in FIG. 4(a), the position commands from the control device 41 to the servo driver SDx, the servo driver SDy and the servo driver SDz are issued at staggered times.

Specifically, the servomotor SMz having the maximum response delay time is set as a standard servomotor, and in order to cause the servomotor SMx and the servomotor SMy to respond in synchronization with a response time T of the servomotor SMz, a command time tx to the servo driver SDx is delayed by dx (a difference (=Rz−Rx) between the response delay times of the standard servomotor SMz and the servomotor SMx) and a command time ty to the servo driver SDy is delayed by dy (a difference (=Rz−Ry) between the response delay times of the standard servomotor SMz and the servomotor SMy) with respect to a command time tz to the servo driver SDz (standard servo driver) which controls the servomotor SMz (standard servomotor).

Figure 4B:
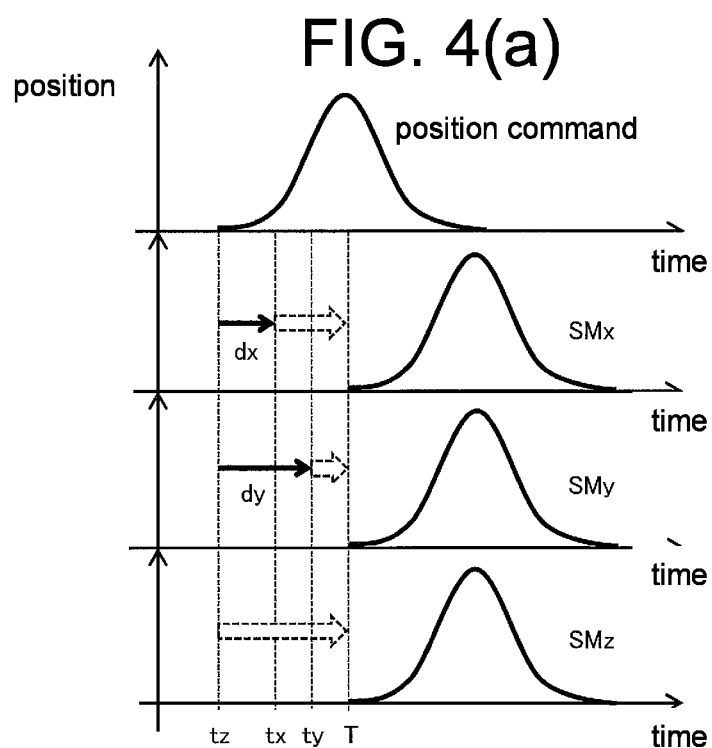

For example, when target position coordinates at a certain time are (Px, Py, Pz), the position command of Px to the servo driver SDx is delayed by dx from the position command of Pz to the servo driver SDz, and the position command of Py to the servo driver SDy is delayed by dy from the position command of Pz to the servo driver SDz. Therefore, as illustrated in FIG. 4(b), it is possible to obtain a trajectory close to the target trajectory.

(Suppression of Trajectory Misalignment Due to Positional Deviation at the Time of Change in Acceleration)

Figure 5:
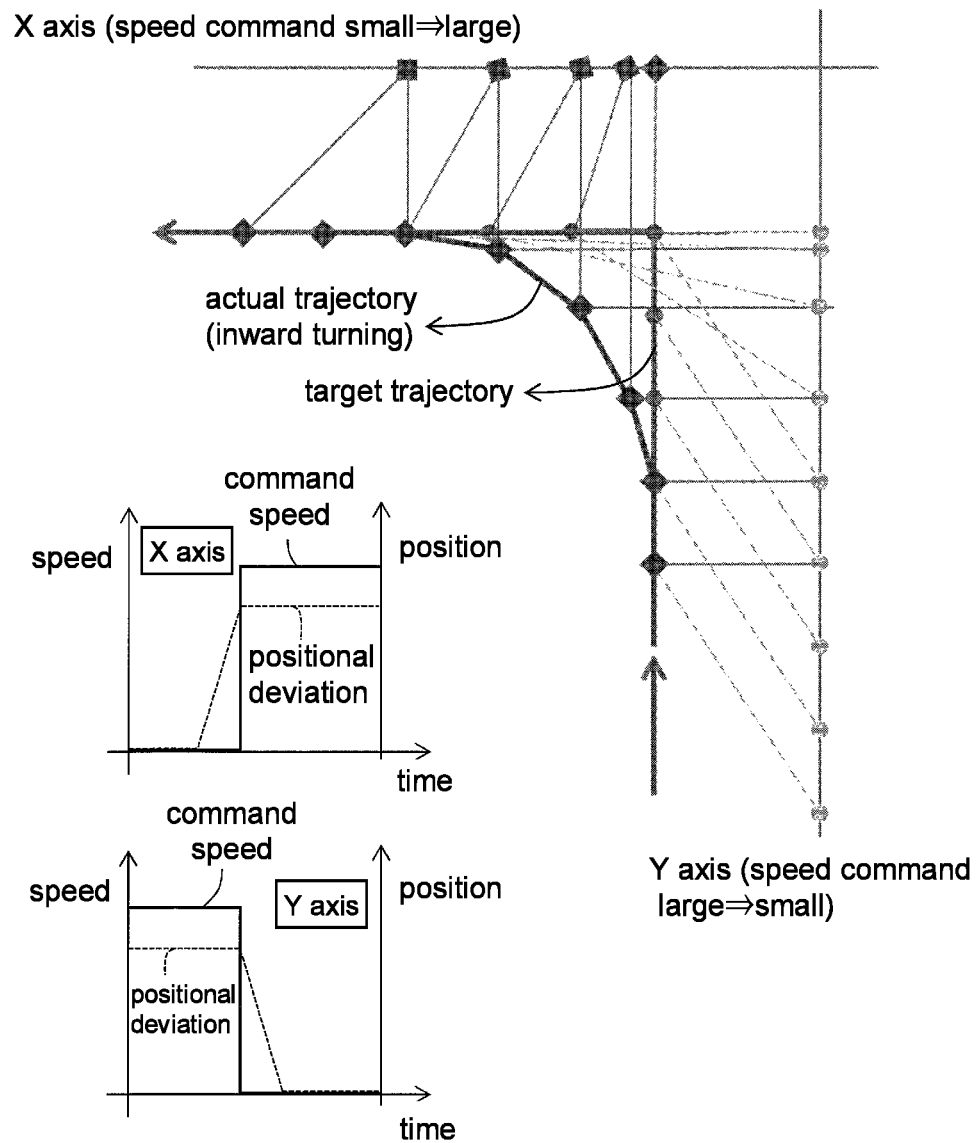
FIG. 5 is a reference diagram illustrating an example of trajectory misalignment due to a positional deviation at the time of a change in acceleration.

Although a response timing between the axes is aligned by the above-described method, there is a response delay of each axis itself. Therefore, as illustrated in FIG. 5, when a speed command to the X axis servo driver is changed from small to large and the speed command to the Y axis servo driver is changed from large to small, the positional deviation (difference between the command position and the feedback position) of the X axis increases temporally while the positional deviation (difference between the command position and the feedback position) of the Y axis decreases temporally, and thus it may result in a trajectory located inward from the target trajectory, as illustrated in FIG. 5.

Figure 6A:
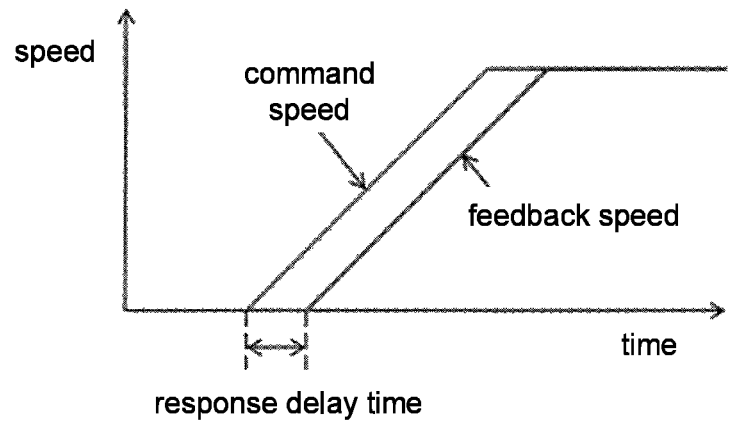
FIG. 6(a) and FIG. 6(b) are reference diagrams illustrating a principle of suppressing the trajectory misalignment due to the positional deviation at the time of the change in the acceleration.
Figure 6B:
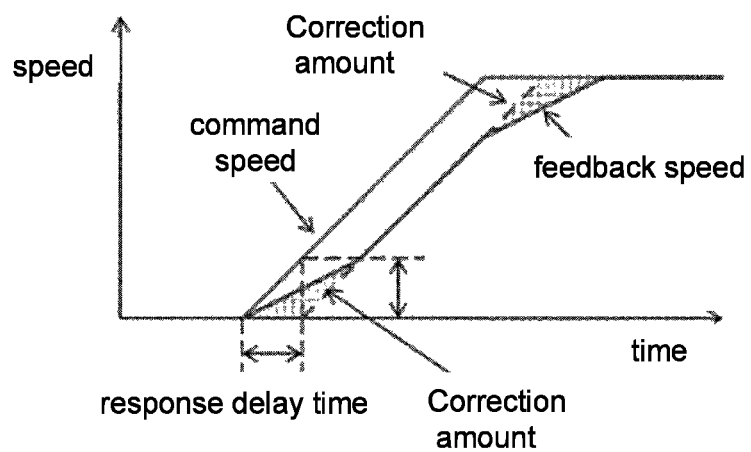

In a model in which the command speed and the feedback speed are misaligned by the response delay time as illustrated in FIG. 6(a), the inventor found that it is effective to correct a shaded portion with respect to the trajectory misalignment due to the positional deviation at the time of a change in acceleration (including a change in a positive direction and a change in a negative direction) as illustrated in FIG. 6(b). Specifically, a correction of the command position is performed by an amount corresponding to (½)× the square of the response delay time×the acceleration (predictive acceleration) which corresponds to an area of the shaded portion.

Figure 7A:
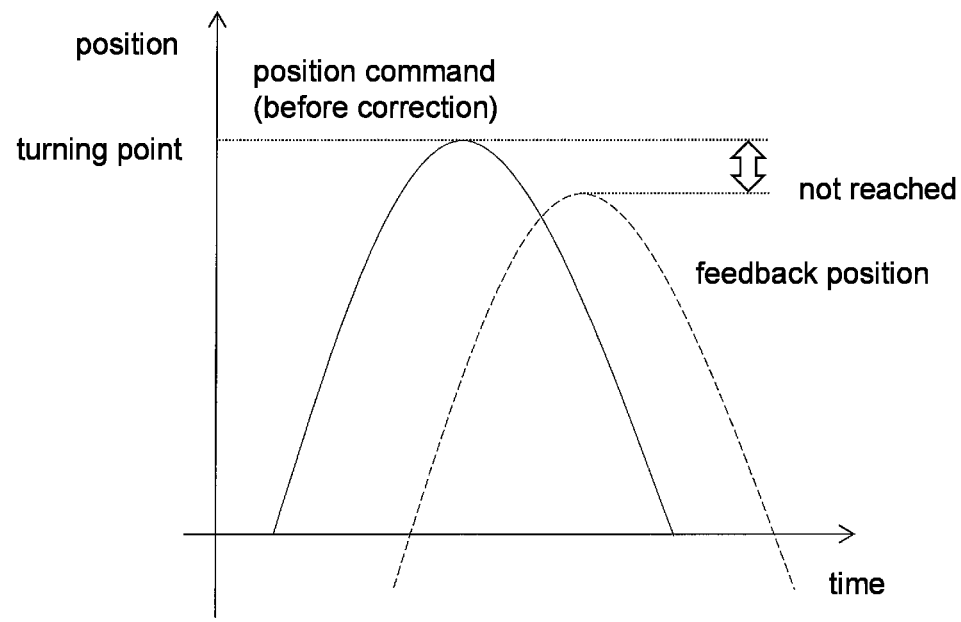
FIG. 7(a) and FIG. 7(b) are reference diagrams illustrating a method of suppressing the trajectory misalignment due to the positional deviation at the time of the change in the acceleration.
Figure 7B:
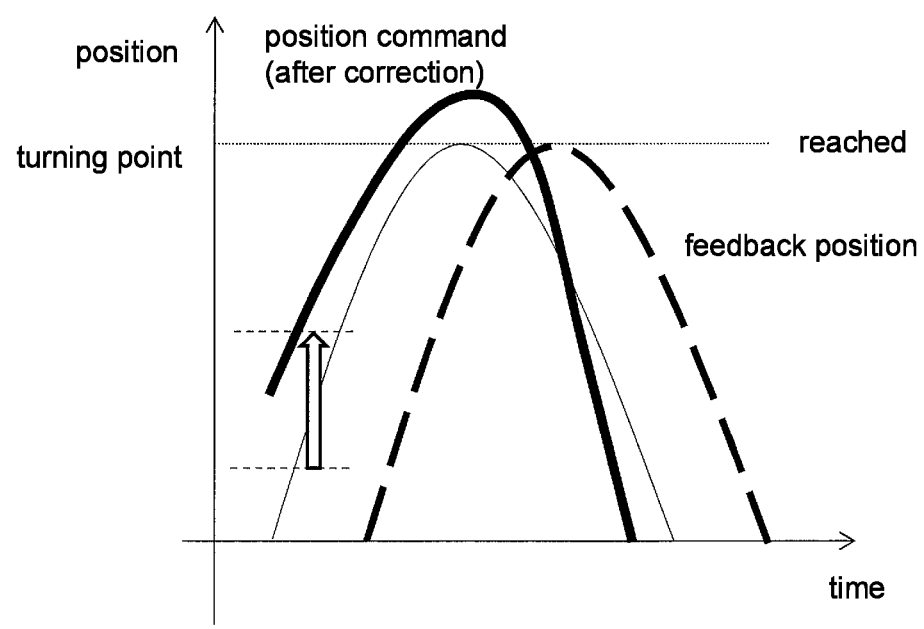

In this way, even when a feedback position of a return trajectory as shown in FIG. 7(a) has not reached a return point, the feedback position reaches the turning point with the correction of the command position, as illustrated in FIG. 7(b).

Figure 8:
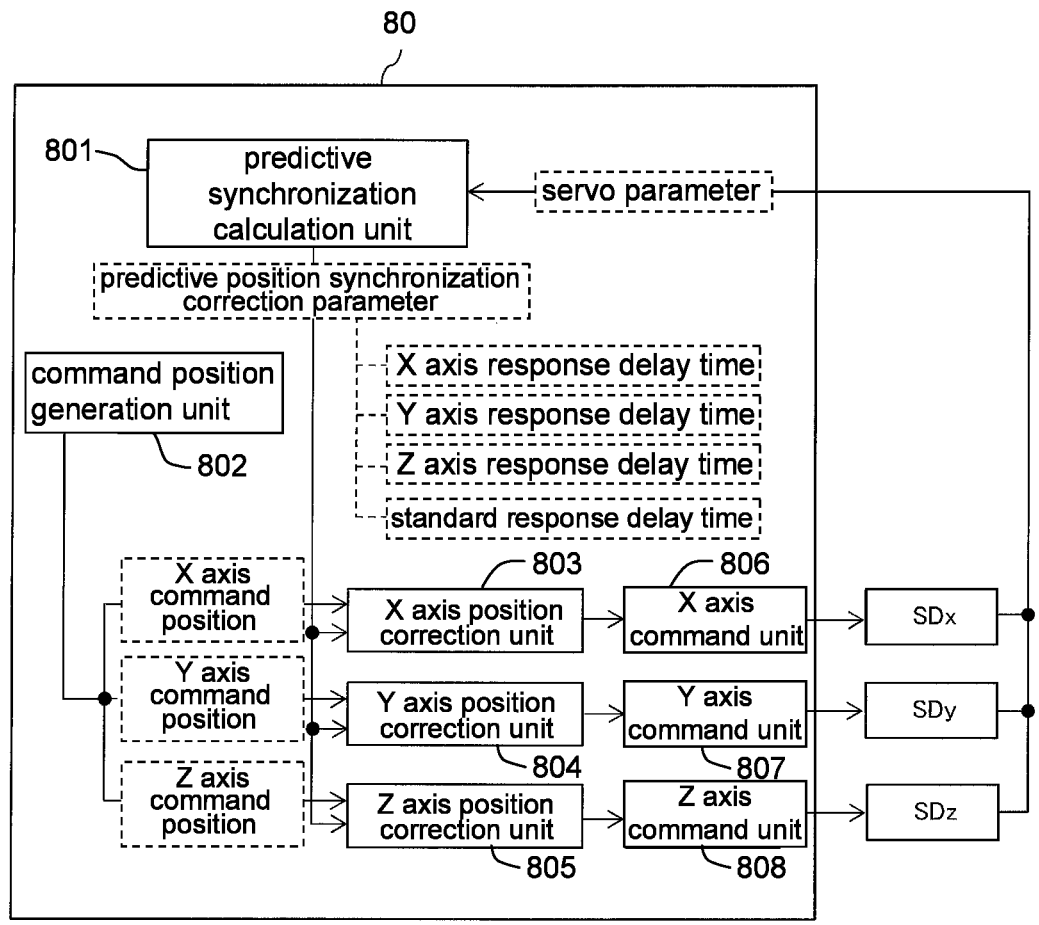
FIG. 8 is a schematic view illustrating a function module of the control device.

The control device according to the embodiment includes a processor 80 having function modules as illustrated in FIG. 8. The function modules of the processor include a predictive synchronization calculation unit 801, a command position generation unit 802, an X axis position correction unit 803, a Y axis position correction unit 804, a Z axis position correction unit 805, an X axis command unit 806, a Y axis command unit 807, and a Z axis command unit 808.

The predictive synchronization calculation unit 801 reads out servo parameters from the servo driver SDx, the servo driver SDy and the servo driver SDz and calculates predictive position synchronization correction parameters including an X axis response delay time, a Y axis response delay time, a Z axis response delay time, and a standard response delay time.

Here, the X axis response delay time (Rx in FIGS. 3 and 4) is an inverse number of a position loop gain which is one of the servo parameters of the servo driver SDx, the Y axis response delay time (Ry in FIGS. 3 and 4) is an inverse number of a position loop gain which is one of the servo parameters of the servo driver SDy, the Z axis response delay time (Rz in FIGS. 3 and 4) is an inverse number of a position loop gain which is one of the servo parameters of the servo driver SDz, and a standard response delay time is a maximum value of Rx, Ry and Rz.

The command position generation unit 802 generates an X axis command position, a Y axis command position, and a Z axis command position on the basis of the target trajectory, inputs the X axis command position to the X axis position correction unit 803, inputs the Y axis command position to the Y axis position correction unit 804 and inputs the Z axis command position to the Z axis position correction unit 805.

The X axis position correction unit 803 performs a correction of the X axis command position (a correction relating to the difference between the response delay times of the axes and a correction relating to the position deviation generated by the change in the acceleration) on the basis of the predictive position synchronization correction parameter, and the X axis command unit 806 issues the position command to the servo driver SDx on the basis of the corrected X axis command position.

The Y axis position correction unit 804 performs a correction of the Y axis command position (the correction relating to the difference between the response delay times of the axes and the correction relating to the position deviation generated by the change in the acceleration) on the basis of the predictive position synchronization correction parameter, and the Y axis command unit 807 issues the position command to the servo driver SDy on the basis of the corrected Y axis command position.

The Z axis position correction unit 805 performs a correction of the Z axis command position (the correction relating to the difference between the response delay times of the axes and the correction relating to the position deviation generated by the change in the acceleration) on the basis of the predictive position synchronization correction parameter, and the Z axis command unit 808 issues the position command to the servo driver SDz on the basis of the corrected Z axis command position.

Figure 9:
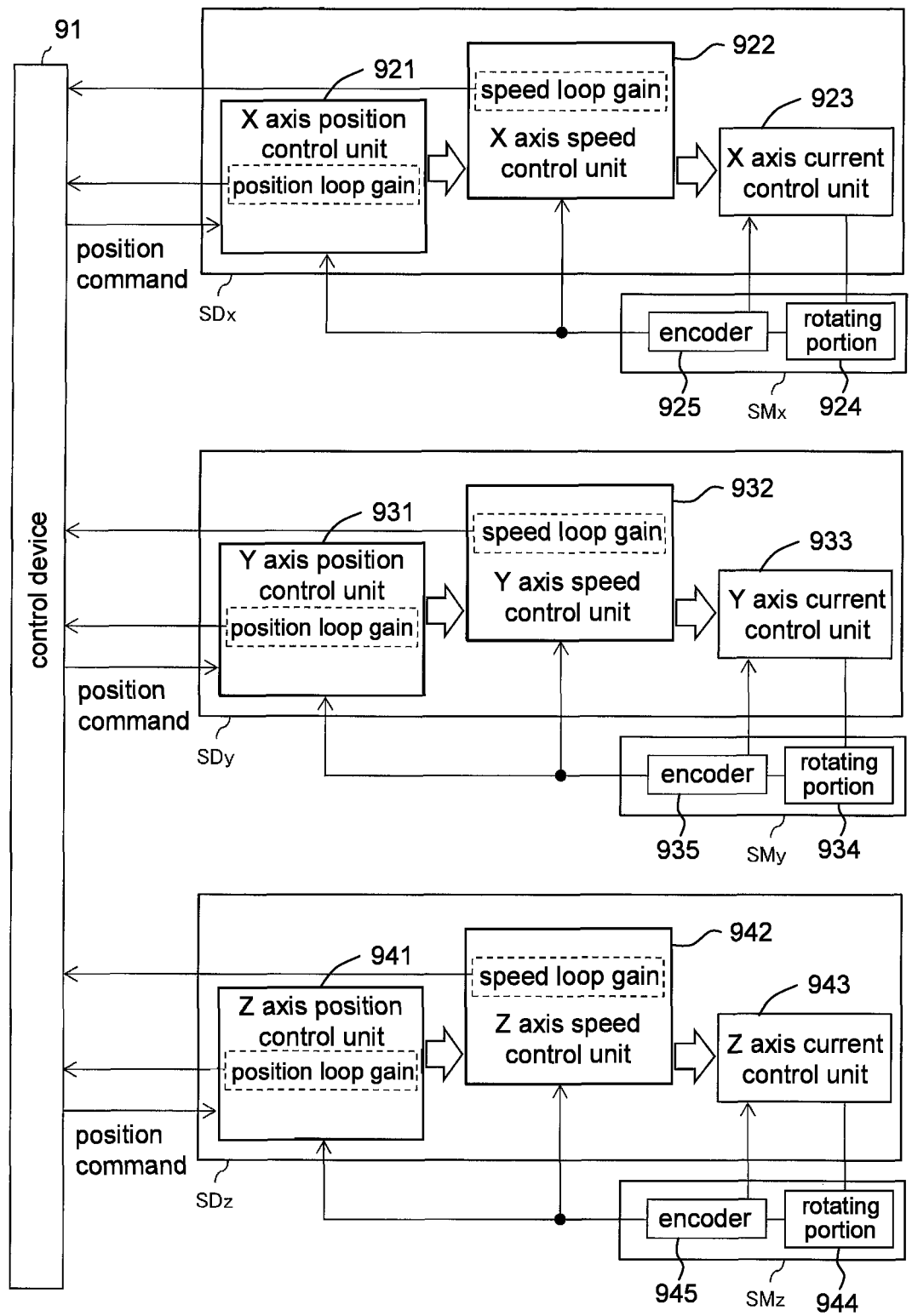
FIG. 9 is a schematic view illustrating a configuration example of each servo driver according to an embodiment.

As illustrated in FIG. 9, the servo driver SDx includes an X axis position control unit 921 which receives the position command from the control device 91, an X axis speed control unit 922 which receives an output from the X axis position control unit 921, and an X axis current control unit (X axis torque control unit) 923 which receives an output from the X axis speed control unit 922, a rotating portion 924 of the servomotor SMx is driven by an output of the X axis current control unit 923, and an output of an encoder 925 of the servomotor SMx is fed back to the X axis position control unit 921, the X axis speed control unit 922 and the X axis current control unit 923. The X axis position control unit 921 outputs a position loop gain to the control device 91, and the X axis speed control unit 922 outputs a speed loop gain to the control device 91.

Further, the servo driver SDy includes a Y axis position control unit 931 which receives the position command from the control device 91, a Y axis speed control unit 932 which receives an output from the Y axis position control unit 931, and a Y axis current control unit (Y axis torque control unit) 933 which receives an output from the Y axis speed control unit 932, a rotating portion 934 of the servomotor SMy is driven by an output of the Y axis current control unit 933, and an output of an encoder 935 of the servomotor SMy is fed back to the Y axis position control unit 931, the Y axis speed control unit 932 and the Y axis current control unit 933. The Y axis position control unit 931 outputs a position loop gain to the control device 91, and the Y axis speed control unit 932 outputs a speed loop gain to the control device 91.

Further, the servo driver SDz includes a Z axis position control unit 941 which receives the position command from the control device 91, a Z axis speed control unit 942 which receives an output from the Z axis position control unit 941, and a Z axis current control unit (Z axis torque control unit) 943 which receives an output from the Z axis speed control unit 942, a rotating portion 944 of the servomotor SMz is driven by an output of the Z axis current control unit 943, and an output of an encoder 945 of the servomotor SMz is fed back to the Z axis position control unit 941, the Z axis speed control unit 942 and the Z axis current control unit 943. The Z axis position control unit 941 outputs a position loop gain to the control device 91, and the Z axis speed control unit 942 outputs a speed loop gain to the control device 91.

Figure 10:
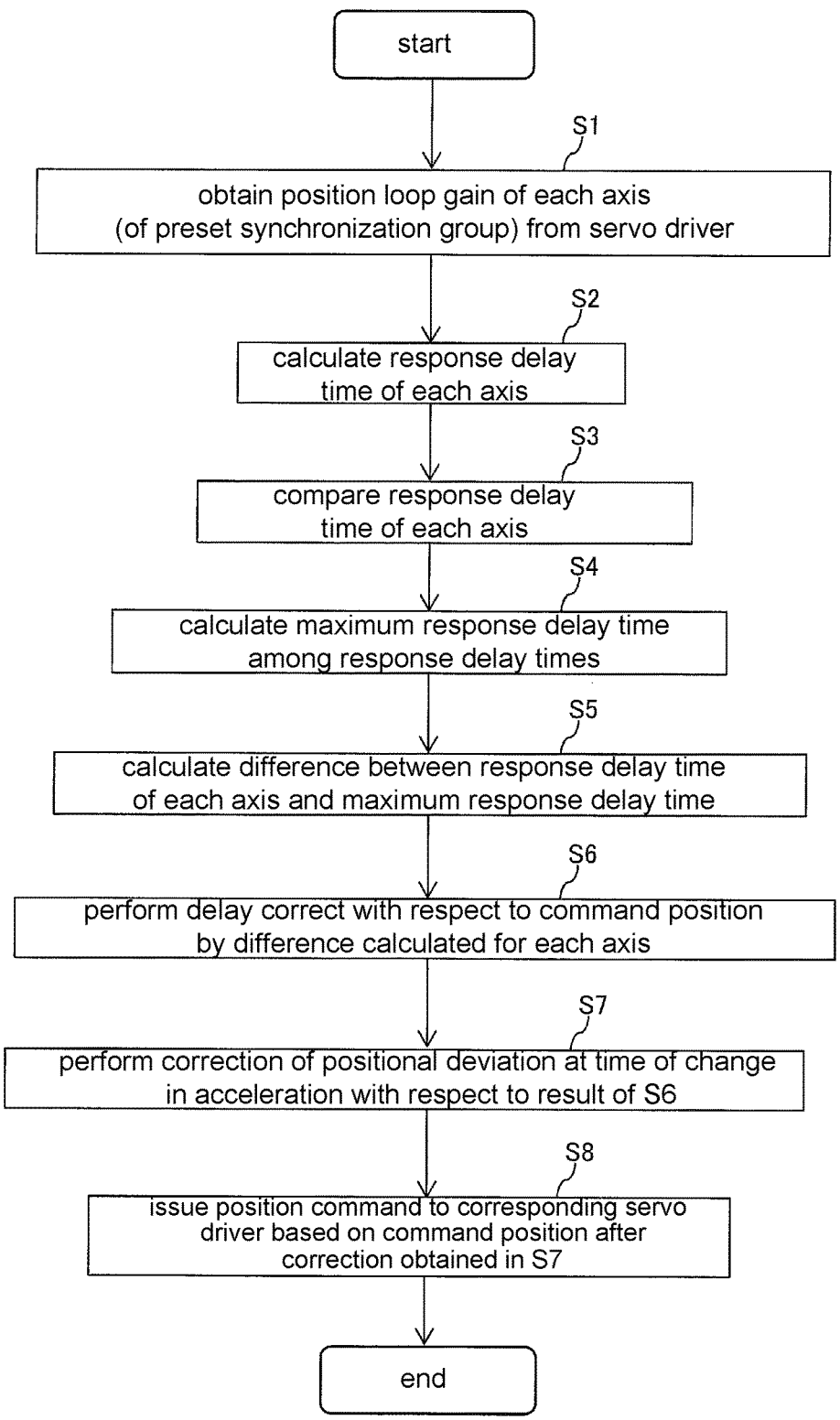
FIG. 10 is a flowchart illustrating processing steps of the control device.

The processor of the control device performs steps S1 to S8 in FIG. 10 by executing, for example, a control program according to the embodiment.

That is, the position loop gain of each axis (of a preset synchronization group) is acquired from the servo driver in Step S1, the response delay time of each of the axes is calculated in Step S2, the response delay times of the axes are compared with each other in Step S3, the maximum response delay time of the response delay times is calculated in Step S4, a difference between the response delay time and the maximum response delay time of each of the axes is calculated in Step S5, a delay correction with respect to the command position by the difference calculated for each of the axes is performed in Step S6, a correction of the position deviation generated by the change in the acceleration according to a result of Step S6, specifically, a correction of the position deviation generated in proportion to the acceleration, is performed in Step S7, and in Step 8, the position command is issued to the corresponding servo driver on the basis of the corrected command position obtained in Step S7.

Figure 11:
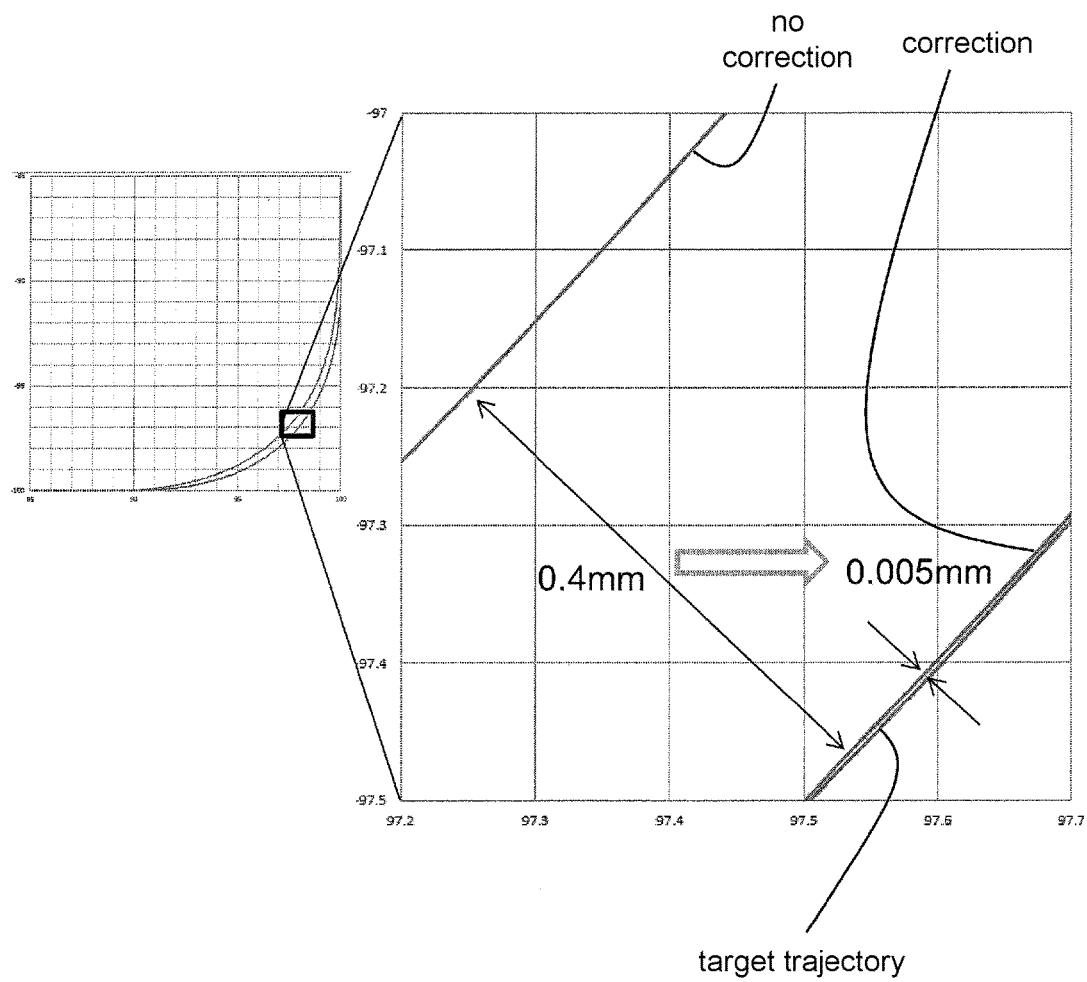
FIG. 11 is a trajectory diagram illustrating an effect of the embodiment.

As described above, it can be understood that the misalignment from the target trajectory is suppressed by performing the correction of the difference between the response delay times of the axes and the correction of the position deviation at the time of the change in the acceleration, as illustrated in FIG. 11.

(Processing Example in Position Correction Unit)

In the X axis position correction unit of FIG. 8 or Step S7 of FIG. 10, the correction of the difference between the response delay times of the axes may be realized by a first term of the following Equation 1, and the correction of the position deviation at the time of the change in the acceleration may be realized by a second term of the following Equation 1.

$$Xcp(t)=X(t-(Rs-Rx))-(\tfrac{1}{2}) \times Rx^2 \times Ax \qquad \text{Equation 1}$$

X(t): Target position (target trajectory)

Xcp(t): Command position provided to the servo driver SDx

Rx: X axis response delay time (of which an inverse number is the position loop gain)

Ax: X axis acceleration (predictive acceleration)

td: Communication delay time (common among the axes)

Rs: Standard response delay time (maximum value of Rx, Ry and Rz)

An effect of Equation 2 can be obtained by Equation 1.

$$Xpp(t)=X(t-(Rs+td))Xap(t) \qquad \text{Equation 2}$$

Xpp(t): Predictive position

Xap(t): Actual position (feedback position) when Xcp(t) is provided

Here, regarding an acceleration Ax of the second term of Equation 1, a primary delay calculation of a result obtained by $(d^2x/dt^2)$ $(t-(Rs-Rx))$ is performed with an inverse number Rx of the position loop gain as a primary delay time constant, and a result obtained by performing the primary delay calculation with $1/(2\pi \times$ speed loop gain$)$ as the primary delay time constant is used as the acceleration Ax.

Further, in the Y axis position correction unit of FIG. 8 or Step S7 of FIG. 10, the correction of the difference between the response delay times of the axes may be realized by a first term of the following Equation 3, and the correction of the position deviation at the time of the change in the acceleration may be realized by a second term of the following Equation 3.

$$Ycp(t)=Y(t-(Rs-Ry))-\tfrac{1}{2} \times Ry^2 \times Ay \qquad \text{Equation 3}$$

Y(t): Target position (target trajectory)

Ycp(t): Command position provided to the servo driver SDy

Ry: Y axis response delay time (of which an inverse number is the position loop gain)

Ay: Y axis acceleration (predictive acceleration)

td: Communication delay time (common among the axes)
Rs: Standard response delay time (maximum value of Rx, Ry and Rz)

An effect of Equation 4 can be obtained by Equation 3.

$$Ypp(t)=Y(t-(Rs+td))Yap(t) \quad \text{Equation 4}$$

Ypp(t): Predictive position
Yap(t): Actual position (feedback position) when Ycp(t) is provided Here, regarding an acceleration Ay of the second term of Equation 3, a primary delay calculation of a result obtained by $(d^2y/dt^2)$ (t−(Rs−Ry)) is performed with an inverse number Ry of the position loop gain as a primary delay time constant, and a result obtained by performing the primary delay calculation with $1/(2\pi \times$ speed loop gain) as the primary delay time constant is used as the acceleration Ay.

Further, in the Z axis position correction unit of FIG. 8 or Step S7 of FIG. 10, the correction of the difference between the response delay times of the axes may be realized by a first term of the following Equation 5, and the correction of the position deviation at the time of the change in the acceleration may be realized by a second term of the following Equation 5.

$$Zcp(t)=Z(t-(Rs-Rz))-\tfrac{1}{2}\times Rz^2 \times Az \quad \text{Equation 5}$$

Z(t): Target position (target trajectory)
Zcp(t): Command position provided to the servo driver SDz
Rz: Z axis response delay time (of which an inverse number is the position loop gain)
Az: Z axis acceleration (predictive acceleration)
td: Communication delay time (common among the axes)
Rs: Standard response delay time (maximum value of Rx, Ry and Rz)

An effect of Equation 6 can be obtained by Equation 5.

$$Zpp(t)=Z(t-(Rs+td))\approx Zap(t) \quad \text{Equation 6}$$

Zpp(t): Predictive position
Zap(t): Actual position (feedback position) when Zcp(t) is provided Here, regarding an acceleration Az of the second term of Equation 5, a primary delay calculation of a result obtained by $(d^2z/dt^2)$ (t−(Rs−Rz)) is performed with an inverse number Rz of the position loop gain as a primary delay time constant, and a result obtained by performing the primary delay calculation with $1/(2\pi \times$ speed loop gain) as the primary delay time constant is used as the acceleration Az.

(Implementation Example by Software)

Each of the functional modules of the control device may be realized by software using a central processing unit (CPU) or may be realized by a logic circuit (hardware) formed in an integrated circuit (IC chip) or the like.

In the former case, the control device includes a CPU which performs an instruction of a control program which is software realizing each function, a read only memory (ROM)) or storage device (these are referred to as "recording media") in which the control program and a variety of data are recorded to be readable by a computer (or CPU), a random access memory (RAM) which develops the control program, and so on. Additionally, the computer (or CPU) reads and executes the control program from the recording medium, thereby achieving an object of the embodiment. A "non-temporary tangible medium" such as a disk, a card, a semiconductor memory, a programmable logic circuit, or the like can be used as the recording medium. Furthermore, the control program may also be provided to the computer via any transmission medium (communication networks, broadcast waves, or the like) which can transmit the control program. In addition, the embodiment can also be realized in the form of data signals embedded in carrier waves in which the control program is embodied by electronic transmission.

This control device is a control device which issues commands to a plurality of servo drivers corresponding to a plurality of servomotors and is characterized in that a servo driver corresponding to a standard servomotor having a maximum response delay time among the plurality of servomotors is set as a standard servo driver, and a command timing to another servo driver is delayed from a command timing to the standard servo driver by a difference between a response delay time of the standard servomotor and a response delay time of the servomotor corresponding to the another servo driver.

According to the above-described configuration, since the response timings of the plurality of servomotors are aligned, it is possible to suppress the trajectory misalignment due to a deviation in the response delay time among the plurality of axes (the plurality of servomotors).

In this control device, the commands may be position commands based on the target trajectory.

In this control device, the response delay time of each of the servomotors may be indicated by an inverse number of a position loop gain of the corresponding servo driver.

In this control device, the position command may be issued with applying a correction of an amount proportional to acceleration at the time of a change in the acceleration of each of the servomotors.

According to the above-described configuration, it is possible to suppress the trajectory misalignment due to the positional deviation at the time of the change in the acceleration.

This control method is a control method of issuing commands to a plurality of servo drivers corresponding to a plurality of servomotors and causing the plurality of servomotors to respond and is characterized by including a first step of obtaining a response delay time of each of the servomotors, a second step of comparing the response delay times, and a third step of setting a servo driver corresponding to a standard servomotor having a maximum response delay time among the plurality of servomotors as a standard servo driver and delaying a position command to another servo driver from a position command to the standard servo driver by a difference between a response delay time of the standard servomotor and a response delay time of the servomotor corresponding to the other servo driver.

According to the above-described method, since the response timings of the plurality of servomotors are aligned, it is possible to suppress the trajectory misalignment due to the deviation in the response delay time among the plural axes (plural servo motors).

In this control method, an inverse number of a position loop gain of each of the servo drivers may be compared in the second step.

This control program causes a processor to execute the first to third steps.

This recording medium is a computer-readable recording medium in which the control program is recorded.

The present invention is not limited to the above-described embodiments, and those obtained by appropriately changing the above embodiments on the basis of common general knowledge or those obtained by combining them are also included in the embodiments of the present invention.

The invention claimed is:
1. A control device which issues commands to a plurality of servo drivers corresponding to a plurality of servomotors, wherein a servo driver among the plurality of servo drivers corresponding to a standard servomotor having a maximum response delay time among the plurality of servomotors is set as a standard servo driver, and a command timing to another servo driver among the plurality of servo drivers is delayed from a command timing to the standard servo driver by a difference between a response delay time of the standard servomotor and a response delay time of a servomotor among the plurality of servomotors corresponding to the another servo driver.

2. The control device according to claim 1, wherein the commands are position commands based on a target trajectory.

3. The control device according to claim 2, wherein the response delay time of each of the plurality of servomotors is indicated by an inverse number of a position loop gain of a corresponding servo driver among the plurality of servo drivers.

4. The control device according to claim 2, wherein the position commands are issued with applying a correction of an amount proportional to acceleration at the time of a change in the acceleration of each of the plurality of servomotors.

5. A control method of issuing commands to a plurality of servo drivers corresponding to a plurality of servomotors and causing the plurality of servomotors to respond, the control method comprising:

a first step of obtaining a response delay time of each of the plurality of servomotors, a second step of comparing the response delay times, and a third step of setting a servo driver among the plurality of servo drivers corresponding to a standard servomotor having a maximum response delay time among the plurality of servomotors as a standard servo driver and delaying a position command to another servo driver among the plurality of servo drivers from a position command to the standard servo driver by a difference between a response delay time of the standard servomotor and a response delay time of a servomotor among the plurality of servomotors corresponding to the another servo driver.

6. The control method according to claim 5, wherein, in the second step, an inverse number of a position loop gain read from each of the plurality of servo drivers is compared.

7. A non-transitory recording medium which is computer-readable, wherein a control program is recorded in the non-transitory recording medium, and the control program causes a processor to execute the first step to the third step disclosed in claim 6.

8. A non-transitory recording medium which is computer-readable, wherein a control program is recorded in the non-transitory recording medium, and the control program causes a processor to execute the first step to the third step disclosed in claim 5.

* * * * *